United States Patent
Zhao et al.

(10) Patent No.: US 11,489,429 B2
(45) Date of Patent: Nov. 1, 2022

(54) FIELD MODULATED DOUBLY SALIENT MOTOR AND DESIGN METHOD FOR DISTRIBUTION OF SALIENT POLE TEETH THEREOF

(71) Applicant: JIANGSU UNIVERSITY, Zhenjiang (CN)

(72) Inventors: Wenxiang Zhao, Zhenjiang (CN); Tingting Jiang, Zhenjiang (CN); Liang Xu, Zhenjiang (CN); Jinghua Ji, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/434,429

(22) PCT Filed: Dec. 4, 2020

(86) PCT No.: PCT/CN2020/133829
§ 371 (c)(1),
(2) Date: Aug. 27, 2021

(87) PCT Pub. No.: WO2022/110273
PCT Pub. Date: Jun. 2, 2022

(65) Prior Publication Data
US 2022/0209641 A1 Jun. 30, 2022

(30) Foreign Application Priority Data
Nov. 30, 2020 (CN) .......................... 202011369698.6

(51) Int. Cl.
*H02K 41/03* (2006.01)
(52) U.S. Cl.
CPC ....... *H02K 41/033* (2013.01); *H02K 2213/03* (2013.01)

(58) Field of Classification Search
CPC .... H02K 41/033; H02K 41/031; H02K 41/03; H02K 2213/03; H02K 1/165; H02K 1/16;
(Continued)

(56) References Cited

U.S. PATENT DOCUMENTS

| 2,826,730 A * | 3/1958 | Biffi | H02J 7/22 |
| | | | 310/168 |
| 2018/0331610 A1 * | 11/2018 | Piech | H02K 1/17 |

FOREIGN PATENT DOCUMENTS

| CN | 101527471 A | 9/2009 |
| CN | 101656459 A | 2/2010 |

(Continued)

OTHER PUBLICATIONS

Machine translation of WO-2021189594-A1. (Year: 2021).*

*Primary Examiner* — Michael Andrews
(74) *Attorney, Agent, or Firm* — Bayramoglu Law Offices LLC

(57) ABSTRACT

A field modulated doubly salient motor and a design method for a distribution of salient pole teeth thereof are provided. The motor includes a stator and a mover, wherein the stator includes a stator core, two sets of windings, and two sets of permanent magnets. Each of the stator teeth is split into two field winding teeth, and each of the field winding teeth is split into two salient pole teeth. The two sets of windings are respectively armature windings and field windings, wherein the armature windings are wound around stator teeth, and the field windings are wound around adjacent field winding teeth that are split from different stator teeth. The two sets of tangentially magnetized permanent magnets are respectively placed on openings and bottoms of field winding slots, and permanent magnets placed in the same slot or at the same positions of adjacent slots have opposite polarities.

4 Claims, 11 Drawing Sheets

(58) Field of Classification Search
CPC ............ H02K 1/17; H02K 3/12; H02K 3/487;
H02K 3/493
USPC ......... 310/12.18, 12.22, 12.21, 12.24, 12.25,
310/216.088, 216.095, 216.096, 216.103
See application file for complete search history.

(56) References Cited

FOREIGN PATENT DOCUMENTS

| | | | |
|---|---|---|---|
| CN | 102035270 A | 4/2011 | |
| CN | 110048573 A | 7/2019 | |
| CN | 111509941 A | 8/2020 | |
| CN | 111969822 A | 11/2020 | |
| KR | 100820168 B1 | 4/2008 | |
| WO | WO-2021189594 A1 * | 9/2021 | ............... H02K 1/16 |

* cited by examiner

FIELD MODULATED DOUBLY SALIENT MOTOR AND DESIGN METHOD FOR DISTRIBUTION OF SALIENT POLE TEETH THEREOF

CROSS REFERENCE TO THE RELATED APPLICATIONS

This application is the national phase entry of International Application No. PCT/CN2020/133829, filed on Dec. 4, 2020, which is based upon and claims priority to Chinese Patent Application No. 202011369698.6, filed on Nov. 30, 2020, the entire contents of which are incorporated herein by reference.

TECHNICAL FIELD

The present invention relates to a field modulated doubly salient motor and a design method for a distribution of salient pole teeth thereof, and belongs to the field of motors. A hybrid excitation doubly salient structure design with a variable magnetic flux is adopted, so that the motor has performance advantages of high thrust and wide speed adjustment range. With the structural feature that two sets of windings and two sets of permanent magnets are both mounted on a stator, the motor can be applied to fields such as aerospace, transportation, and wind power generation.

BACKGROUND

With the continuous development of switched reluctance motors, American scholars Professor Lipo et al. have introduced permanent magnets into switched reluctance motors and proposed doubly salient permanent magnet motors. Due to the high price of permanent magnet materials, in order to reduce manufacturing costs of motors, doubly salient electro-magnetic motors have been developed on this basis. The doubly salient electro-magnetic motor has windings all placed on a stator side, with a mover side being a simple salient structure, so that the motor has desirable temperature management and high-speed operation capabilities. As compared with the doubly salient permanent magnet motors, the doubly salient electro-magnetic motors can have field winding magnetic fields controlled by changing field winding currents, which has a simple control and high reliability, and have a broad application prospect in fields such as aerospace, transportation, and wind power generation.

The Chinese Invention Patent Application No. CN201910270245.9 has disclosed a loss-of-excitation fault-tolerant double-stator doubly salient electro-magnetic motor and a method thereof. In this motor, a set of inner stator windings is additionally arranged through a double-stator structure, to make full use of the motor space, and a rotor is provided with a magnetic isolation bridge, the main magnetic flux is closed by an outer stator, the rotor, and an inner stator, so that the motor can also provide a sufficient reluctance torque at a loss-of-excitation fault to realize a loss-of-excitation fault-tolerant operation of the motor. Although the motor has the fault-tolerance, due to the limitation of the electro-magnetic motor itself, in order to further improve the thrust of the motor, permanent magnets are introduced into the electro-magnetic motor, so that the motor can have both a high thrust density of a permanent magnet motor and a wide speed range.

The Chinese Invention Patent No. CN201010592364.5 has disclosed two axial excitation doubly salient motors. The two motors each include at least two doubly salient monolithic structures that are axially arranged. In the first structure, a stator core and a rotor core each form an axial magnetic path through an axial magnetically conductive back iron. In the second structure, a stator core, an axial magnetically conductive back iron of a stator, and permanent magnets are all are structures. The invention has a high space utilization, no additional air gaps, and has a high excitation efficiency. Although the invention effectively saves space, and the introduction of the permanent magnets also increases the thrust density and excitation efficiency of the motor, the complex structural design also brings difficulty to production and manufacturing.

The Chinese invention Patent Application No. CN202010097798.1 has disclosed a doubly salient permanent magnet motor with an adjustable effective permanent magnet pole number. In the motor, a pulse current is applied to field windings to change a magnetization direction of a low-coercivity permanent magnet, and the number of permanent magnet poles of the doubly salient permanent magnet motor is adjusted, so that the motor has a wide magnetic regulation range, and is efficient in a wide area. Although the motor has the wide magnetic regulation range and a high thrust density, the application of the pulse current to the field windings also increases the design difficulty of a control circuit. In addition, it is also a problem to be faced that the excessive pulse current causes the risk of irreversible demagnetization of permanent magnets.

Based on the current researches, for the research on the performance of doubly salient motors, complex structural designs are generally adopted to improve the fault-tolerance or thrust capabilities of the motors, alternatively or the shape of introduced permanent magnets and the current of field windings are investigated, but the characteristics of salient pole teeth of the doubly salient motors themselves have not been studied.

SUMMARY

The objective of the present invention is to provide, in view of the lack of research on the distribution of salient pole teeth of existing doubly salient motors, a field modulated doubly salient motor and a design method for a distribution of salient pole teeth thereof. A design method for a distribution of salient pole teeth is disclosed according to the principle of magnetic field modulation: the distribution mechanism of salient pole teeth is found out so as to optimize the amplitude of working harmonics and improve the thrust and magnetic regulation ability of the motor. Considering the high price of permanent magnet materials, the motor design is based mainly on field windings and supplemented by a permanent magnet material, and a field modulated doubly salient motor is designed by maximizing the performance of the field windings. Besides, in order to further improve the thrust ability of the motor, permanent magnets are designed to enhance the anti-saturation ability of the motor.

Specifically, the motor of the present invention is implemented using the following technical solutions.

A field modulated doubly salient motor includes a stator and a mover, wherein the stator includes a stator core, stator teeth, armature windings, field windings, first permanent magnets, and second permanent magnets. Each of the stator teeth is split into two field winding teeth, each of the field winding teeth is split into a first salient pole tooth and a second salient pole tooth. The armature windings are wound around the stator teeth, and in order to ensure that centerlines of the field windings and the armature windings have a distance of half a stator tooth, each of the field windings is wound around adjacent two of the field winding teeth that are split from different stator teeth. The first permanent magnets and the second permanent magnets are both tangentially magnetized, and are both placed in field winding slots. The first permanent magnets are placed on openings of the field winding slots, and the second permanent magnets are embedded on bottoms of the field winding slots. Permanent magnets placed at same positions of adjacent two of the slots have opposite polarities, and permanent magnets in a same slot also have opposite polarities. When permanent magnet excitation is performed alone, two permanent magnets in the same slot form a closed magnetic path in a stator tooth. The mover is formed by arranging a plurality of rotor salient poles, and an air-gap magnetic field has abundant working harmonics through double-sided modulation.

Further, tooth widths of the first salient pole tooth and the second salient pole tooth split from the same field winding tooth are independent and do not affect each other. The distribution of the salient pole teeth of the stator is optimized, and the amplitude of each order of working harmonics is adjusted, thereby improving the thrust of the motor.

Further, a number of the stator teeth is $N_s$, the widths of the first salient pole tooth and the second salient pole tooth are respectively $\beta_1$ and $\beta_2$, slot opening widths of the armature windings and the field windings are respectively $\beta_3$ and $\beta_5$, a width of a field winding recess formed after a single field winding tooth is split is $\beta_4$, a number of the rotor salient poles is $N_r$, each tooth pole pitch is $\tau_p$, and a relationship between the parameters may be represented as:

$$\beta_1+\beta_2+\beta_3+\beta_4+\beta_5=N_r\tau_p/N_s$$

The technical solution of the design method of the present invention includes the following. A total number of the salient pole teeth of the stator is $4N_s$, wherein a number of first salient pole teeth and a number of second salient pole teeth are both $2N_s$. The distribution of the salient pole teeth is related to $\beta_1$, $\beta_2$, $\beta_3$, $\beta_4$, and $\beta_5$. The design method for the distribution of the salient pole teeth mainly includes generalizing distribution rules of the salient pole teeth; deriving an order and an amplitude of a no-load air-gap flux density in each situation; and then solving a back electromotive force through the flux density, and comparing magnitudes of back electromotive forces to obtain an optimal mode of distribution of the salient pole teeth. The design method for the distribution of the salient pole teeth specifically includes:

step 1: starting from $\beta_1$, $\beta_2$, $\beta_3$, $\beta_4$, and $\beta_5$, designing the distribution of the salient pole teeth, wherein based on a single stator tooth, the distribution of the salient pole teeth may be generalized into the following three models Model:

Model I: when $\beta_1$, $\beta_2$, $\beta_3$, $\beta_4$ and $\beta_5$ are unequal to each other, each stator tooth has one smallest unit;

Model II: when widths of slot openings of field windings and slot openings of armature windings are equal and widths of the first salient pole teeth and the second salient pole teeth are equal, that is, $\beta_1 \neq \beta_4 \neq \beta_3$, $\beta_1=\beta_3$, $\beta_3=\beta_5$, each stator tooth has two smallest units;

Model III: when the widths of the slot openings of the field windings, the slot openings of the armature windings, and field winding recesses are equal and the widths of the first salient pole teeth and the second salient pole teeth are equal, that is, $\beta_1 \neq \beta_3$, $\beta_1=\beta_2=\beta_4$, $\beta_3=\beta_5$, each stator tooth has four smallest units;

step 2: as the first permanent magnets and the second permanent magnets form closed magnetic paths only in a stator core, and an air-gap flux density is generated by the field windings, only analyzing the field windings, and an air-gap magnetomotive force of the field windings is:

$$F_{fw}(\theta) = \sum_{i=1,3,...}^{\infty} \frac{16 N_f i_f \sin(i N_s \beta_5/2)}{\pi N_s \beta_5 i^2} \sin\left(\frac{N_s}{2} i\theta\right)$$

wherein $F_{fw}$ is a magnetomotive force of the field windings, i is a positive odd number, $\theta$ is a mechanical angle that a rotor is rotated by, and $N_f$ and $i_f$ are respectively a number of turns in series per phase and a field winding current;

a magnetic permeance of the rotor is:

$$\Lambda_r(\theta, t) = \Lambda_{r0} + \sum_{j=1,2,...}^{\infty} \Lambda_{rj}\cos[jN_r(\theta - \omega t - \theta_0)]$$

wherein j is a positive integer, $\theta$ is the mechanical angle that the rotor is rotated by, $\theta_0$ is an initial position angle of the rotor, $\omega$ is a mechanical angular velocity, and $\Lambda_{r0}$ and $\Lambda_0$ are respectively $0^{th}$ order and $jN_r^{th}$ order magnetic permeabilities;

since the above formula enables qualitative analysis only and disables quantitative solving, in order to quantitatively analyze the magnetic permeance of the rotor, the magnetic permeance $\Lambda_r(\theta,t)$ of the rotor may be represented as follows according to size parameters of the motor:

$$\Lambda_r(\theta, t) = \frac{u_0}{\delta + \delta_r(\theta, t)}$$

wherein $\mu_0$ is a relative air magnetic permeance, $\delta$ is an air-gap length, and $\delta_r(\theta,t)$ is an air-gap length on the rotor side;

$$\delta_r(\theta, t) = \frac{N_r \beta_r^2 R_{ap}}{64} + \sum_{m=1,2,...}^{\infty} \frac{R_{ap}}{m^2 N_r}\sin^2\left(\frac{mN_r\beta_r}{4}\right)\cos(mN_r(\theta - \omega t - \theta_0))$$

wherein m is a positive integer, $\beta_r$ is a slot opening width of the rotor, $R_{ap}$ is an air-gap radius, and t is a corresponding time;

step 3: as the distribution of the salient pole teeth affects a form of the stator teeth, and then a magnetic permeance of the stator changes accordingly, if a variable $S_p$ is used to represent a number of smallest units in different situations, representing the magnetic permeance $\Lambda_s(\theta)$ of the stator as:

$$\Lambda_s(\theta) = \Lambda_{s0} + \sum_{k=1,2,...}^{\infty} \Lambda_{sk}\cos(kS_pN_s\theta)$$

wherein k is a positive integer, and $\Lambda_{s0}$ and $\Lambda_{sk}$ are respectively $0^{th}$-order and $kS_p^{th}$-order magnetic permeabilities;

like the magnetic permeance of the rotor, the above formula also enables qualitative analysis only and disables quantitative solving, in order to quantitatively analyze the magnetic permeance of the stator, the magnetic permeance of the stator may be represented as follows according to the size parameters of the motor:

$$\Lambda_s(\theta) = \frac{u_0}{\delta + \delta_s(\theta)}$$

$$\delta_s(\theta) = \frac{3R_{ap}}{16}(2\beta_4^2 + \beta_3^2 + \beta_5^2) + \sum_{n=1,2,\cdots}^{\infty} b_n \cos(nS_p N_s \theta)$$

wherein n is a positive integer, $\delta_s(\theta)$ is an air-gap length on the stator side, and the coefficient $b_n$ is represented as:

$$b_n = \frac{R_{ap}}{2n^2 S_p N_s} \left[ \begin{array}{c} \sin^2\left(\frac{nS_p N_s \beta_5}{4}\right) + (-1)^n \sin^2\left(\frac{nS_p N_s \beta_3}{4}\right) + \\ 2\sin^2\left(\frac{nS_p N_s \beta_4}{4}\right) \cos\left(nS_p N_s \left(\frac{\beta_5 + \beta_4 + 2\beta_2}{2}\right)\right) \end{array} \right]$$

according to the quantitative representation of the magnetic permeance of the stator, an order and an amplitude of magnetic permeance harmonics of the stator are both related to a value of $S_p$;

step 4: A magnetic permeance of the motor is a synthetic magnetic permeance $\Lambda(\theta,t)$ of the magnetic permeance of the stator and the magnetic permeance of the rotor:

$$\Lambda(\theta, t) = \frac{\delta}{u_0} \Lambda_s(\theta) \Lambda_r(\theta, t)$$

A flux density $B(\theta,t)$ of the field windings is represented as:

$$B(\theta, t) = \underbrace{\Lambda_0 \sum_{i=1,3,\cdots}^{\infty} F_i \sin\left(i\frac{N_s}{2}\theta\right)}_{1} + \underbrace{\Lambda_k \sum_{i=1,3,\cdots}^{\infty} \frac{F_i}{2}\sin\left[\left(i\frac{N_s}{2} \pm kS_p N_s\right)\theta\right]}_{2} +$$

$$\underbrace{\Lambda_j \sum_{i=1,3,\cdots}^{\infty} \frac{F_i}{2}\sin\left[\left(i\frac{N_s}{2} \pm jN_r\right)\theta \mp jN_r(\omega t + \theta_0)\right]}_{3} +$$

$$\underbrace{\Lambda_{kj} \sum_{i=1,3,\cdots}^{\infty} \frac{F_i}{2}\sin\left[\left(i\frac{N_s}{2} \pm (kS_p N_s + jN_r)\right)\theta \mp jN_r(\omega t + \theta_0)\right]}_{4} +$$

$$\underbrace{\Lambda_{kj} \sum_{i=1,3,\cdots}^{\infty} \frac{F_i}{2}\sin\left[\left(i\frac{N_s}{2} \pm (kS_p N_s - jN_r)\right)\theta \pm jN_r(\omega t + \theta_0)\right]}_{5}$$

wherein $\Lambda_0$, $\Lambda_k$, $\Lambda_j$, and $\Lambda_{kj}$ are respectively $0^{th}$-order, stator $k^{th}$-order, $j^{th}$-order, and $k^{th}$-order magnetic, permeabilities, and $F_i$ is a coefficient;

the flux density is formed of five parts, the first two parts are stationary, the remaining parts are rotary, and orders of the fourth and fifth parts are both related to $kS_p$, and thus, different $S_p$ makes both harmonic composition of the flux density of the motor and a corresponding amplitude change;

step 5: a winding function $N(\theta)$ is:

$$N(\theta) = \frac{2N_i}{\pi} \sum_{v=1,2,\cdots}^{\infty} \frac{(-1)^v}{v} \sin\left(\frac{v\pi}{3}\right) \sin\left(\frac{vN_s}{2}\theta\right)$$

wherein v is a positive integer, and $N_i$ is a number of turns in series of the armature windings;

a flux linkage $\Psi_p(t)$ of each phase is:

$$\psi_p(t) = R_{ap} l_a \int_0^{2\pi} N(\theta) B(\theta,t) d\theta$$

wherein $l_a$ is an effective axial length of the motor;
a back electromotive force is:

$$E_p(\theta) = -R_{ap} l_a \frac{d\left(\int_0^{2\pi} N(\theta) B(\theta, t) d\theta\right)}{dt}$$

Magnetic permeance of the stator, flux densities, flux linkages, and back electromotive forces in the three models can be calculated through derivation according to the above formulas. First, influences of different distributions of the salient pole teeth on magnetic permeance harmonics of the stator are analyzed according to a magnetic permeance model; then, differences in orders and amplitudes of the flux densities in different situations are obtained through the calculated flux densities; afterwards, magnitudes of flux linkages in different distributions are compared; and finally, an optimal distribution structure is obtained through the calculated back electromotive forces.

Beneficial Effects

With the aforementioned design solutions, the present invention can have the following beneficial effects:

1. In the present invention, the distribution of salient pole teeth of a double-sided multi-tooth motor is designed, distribution rules of the salient pole teeth are summarized, an amplitude and a magnitude of air-gap flux density harmonics are derived, and the influence of the distribution of the salient pole teeth on working harmonics is obtained; the thrust of the motor in different distributions of the salient pole teeth is calculated. Through the research on the design method for distribution of salient pole teeth, the amplitude of working harmonics is optimized, and the thrust of the motor is improved.

2. The mover in the present invention is merely a simple salient-pole structure. For the doubly salient motor, the simple salient-pole structure of the mover can greatly reduce manufacturing costs and lower the processing difficulty.

3. The two sets of windings in the present invention are both placed in different slots of the stator, and adopt a double-layer concentrated manner. The winding manner can effectively reduce the end length, and reduce the copper loss of the motor; since the windings are placed in different slots, the complexity of winding is effectively reduced, and the processibility is improved; the two sets of windings are physically independent, so that the fault-tolerance of the motor is improved.

4. The two sets of windings and the two permanent magnets in the present invention are both placed on the stator, the armature windings are fed with a three-phase alternating current, the field windings are fed with a direct current, and the motor does not have brushes or slip rings, so that the reliability of motor operation is effectively improved, and the difficulty of periodic maintenance of personnel is reduced.

5. The hybrid excitation doubly salient motor designed in the present invention based mainly on field winding excitation and supplemented by permanent magnets has the advantage of wide speed adjustment and is applicable to the field of urban rail transit, and is further applicable to linear reciprocating motion occasions such as numerical control machining lathes.

6. A doubly salient motor based mainly on field windings and supplemented by permanent magnets is designed in the present invention based on the principle of magnetic field modulation, the number of permanent magnets used is minimized while the excitation ability is maximized, so as to achieve the optimal cost performance; the number of pole-pairs of the armature windings, the number of pole-pairs of the field windings, and the number of salient poles of the rotor are reasonably designed, so that the armature windings can sufficiently absorb harmonics of the field winding magnetic field and the motor can have multiple working harmonics, thereby improving the thrust of the motor and the magnetic regulation ability of the field windings.

BRIEF DESCRIPTION OF THE DRAWINGS

FIG. 5A is a schematic diagram illustrating the distribution of salient pole teeth when the number $S_p$ of smallest units is 1; FIG. 5B is a schematic diagram illustrating the distribution of salient pole teeth when the number $S_p$ of smallest units is 2; and FIG. 5C is a schematic diagram illustrating the distribution of salient pole teeth when the number $S_p$ of smallest units is 4;

FIG. 6A illustrates the waveforms of the magnetic permeance of the stator, and FIG. 6B illustrates the harmonic distributions;

FIG. 7A illustrates the waveforms of air-gap harmonics, and FIG. 7B illustrates the harmonic distributions;

FIG. 8A illustrates the waveforms of the flux linkage, and FIG. 8B illustrates the harmonic distributions of the flux linkage;

FIG. 9A illustrates the waveforms of the back electromotive force, and FIG. 9B illustrates the harmonic distributions of the back electromotive force;

Figure 1:
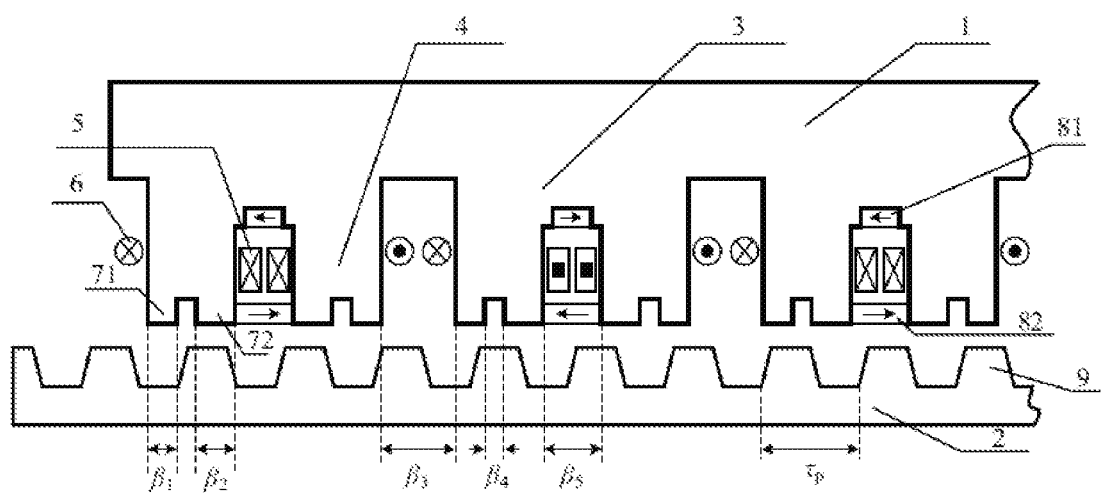
FIG. 1 is a schematic structural view of a field modulated doubly salient motor in an embodiment of the present invention.

In the drawings, 1. stator, 2. mover, 3. stator tooth, 4. field winding tooth, 5. field winding, 6. armature winding, 71. first salient pole tooth, 72, second salient pole tooth, 81. first permanent magnet, 82. second permanent magnet, 9. salient pole of mover.

DETAILED DESCRIPTION OF THE EMBODIMENTS

In order to make the objectives, technical solutions, and effects of the present invention clearer, the structural features and beneficial effects of a motor in the present invention are described in detail below with reference to the accompanying drawings and specific embodiments.

Figure 2:
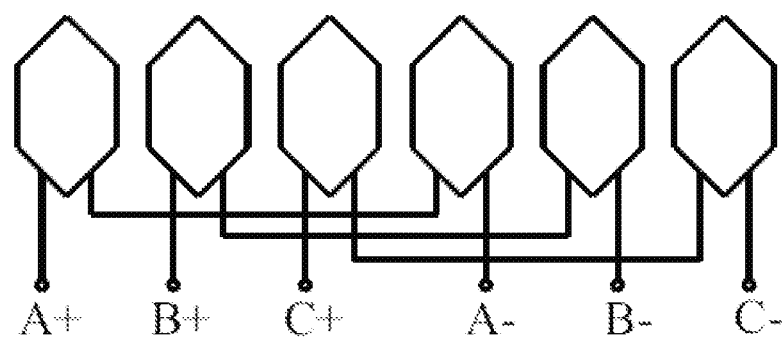
FIG. 2 is a schematic diagram illustrating connection of an armature winding in an example of the present invention.
Figure 3:
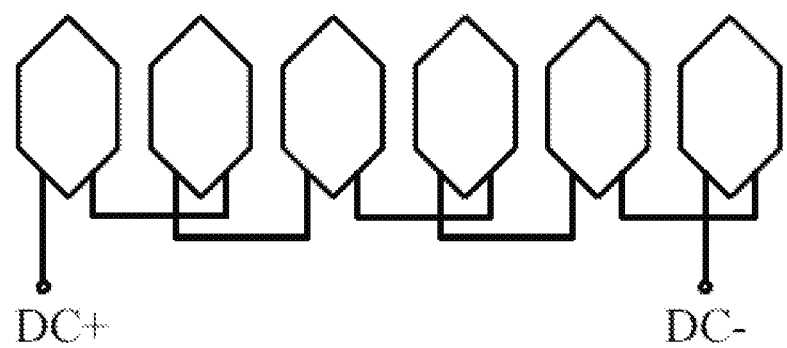
FIG. 3 is a schematic diagram illustrating connection of a field winding in the example of the present invention.

As shown in FIG. 1, the present invention discloses a field modulated doubly salient motor and a design method for a distribution of salient pole teeth. The motor includes a stator (1) and a mover (2), where the stator includes a stator core, armature windings (6), field windings (5), first permanent magnets (81), and second permanent magnets (82). Each of stator teeth (3) is split into two field winding teeth (4), and each of the field winding teeth (4) is split into two salient pole teeth (71 and 72). The armature windings (6) are wound around the stator teeth (3), and each of the field windings (5) is wound around adjacent two of the field winding teeth (4) that are split from different stator teeth (3). Connection relationships of the armature windings and the field windings are shown in FIGS. 2 to 3.

The armature windings (6) are wound around the stator teeth (3), and in order to ensure that centerlines of the field windings and the armature windings have a distance of half a stator tooth, each of the field windings (5) is wound around adjacent two of the field winding teeth (4) that are split from different stator teeth.

The motor is characterized in that the two sets of permanent magnets (81 and 82) are both tangentially magnetized, the permanent magnets (81 and 82) are both placed in field winding slots, the first permanent magnets (81) are placed on openings of the field winding slots, and the second permanent magnets (82) are embedded on bottoms of the field winding slots. Permanent magnets placed at same positions of adjacent two of the slots have opposite polarities, and permanent magnets in a same slot also have opposite polarities. When permanent magnet excitation is performed alone, two permanent magnets in the same slot form a closed magnetic path in a stator tooth. Under high power load, the permanent magnets can effectively inhibit saturation of the motor and improve the thrust of the motor.

The motor is characterized in that since the stator of the motor has a plurality of salient pole teeth, and sizes of two salient pole teeth split from the same field winding tooth are independent, while the mover is merely a simple salient pole, an air-gap magnetic field has abundant working harmonics through double-sided modulation. The distribution of the salient pole teeth of the stator is optimized, and the amplitude of each order of working harmonics is adjusted, thereby improving the thrust of the motor.

The motor is characterized in that a number of the stator teeth is $N_s$ the widths of the first salient pole tooth (71) and the second salient pole tooth (72) are respectively $\beta_1$ and $\beta_2$, slot opening widths of the armature windings and the field windings are respectively $\beta_3$ and $\beta_5$, a width of a field winding recess formed after a single field winding tooth is split is $\beta_4$, a number of the rotor salient poles is $N_r$, each tooth pole pitch is $\tau_p$, and a relationship between the parameters may be represented as:

$$\beta_1+\beta_2+\beta_3+\beta_4+\beta_5=N_r\tau_p/N_s$$

The motor is characterized in that a total number of salient pole teeth is $4N_s$, where a number of first salient pole teeth (71) and a number of second salient pole teeth (72) are both $2N_s$. The distribution of the salient pole teeth is related to $\beta_1$, $\beta_2$, $\beta_3$, $\beta_4$, and $\beta_5$. The main idea of the design method for distribution of salient pole teeth includes generalizing distribution rules of the salient pole teeth; deriving an order and an amplitude of a no-load air-gap flux density in each situation; and then solving a back electromotive force through the flux density, and comparing magnitudes of back electromotive forces to obtain an optimal mode of distribution of the salient pole teeth. The design method for the distribution of the salient pole teeth specifically includes the following steps.

Step 1: Starting from $\beta_1$, $\beta_2$, $\beta_3$, $\beta_4$, and $\beta_5$, the distribution of the salient pole teeth is designed, where based on a single stator tooth, the distribution of the salient pole teeth may be generalized into the following three situations:

situation 1: when the five variables are unequal to each other, each stator tooth has one smallest unit;

situation 2: when widths of slot openings of field windings and slot openings of armature windings are equal and widths of the first salient pole teeth and the second salient pole teeth are equal, that is, ($\beta_1 \neq \beta_4 \neq \beta_3$, $\beta_1=\beta_2$, $\beta_3=\beta_5$), each stator tooth has two smallest units;

situation 3: when the widths of the slot openings of the field windings, the slot openings of the armature windings, and field winding recesses are equal and the widths of the first salient pole teeth and the second salient pole teeth are equal, that is, ($\beta_1 \neq \beta_3$, $\beta_1=\beta_2=\beta_4$, $\beta_3=\beta_5$), each stator tooth has four smallest units.

Step 2: The first permanent magnets and the second permanent magnets form closed magnetic paths only in a stator core, and an air-gap flux density is generated by the field windings. Thus, only the field windings need to be analyzed. An air-gap magnetomotive force of the field windings is:

$$F_{fw}(\theta) = \sum_{i=1,3,\cdots}^{\infty} \frac{16 N_f i_f \sin(i N_s \beta_5 / 2)}{\pi N_s \beta_5 i^2} \sin\left(\frac{N_s}{2} i\theta\right)$$

where $F_{fw}$ is a magnetomotive force of the field windings, i is a positive odd number, $\theta$ is a mechanical angle that a rotor is rotated by, and $N_f$ and $i_f$ are respectively a number of turns in series per phase and a field winding current.

A magnetic permeance of the rotor is:

$$\Lambda_r(\theta, t) = \Lambda_{r0} = \sum_{j=1,2,\cdots}^{\infty} \Lambda_{rj} \cos[jN_r(\theta - \omega t - \theta_0)]$$

where j is a positive integer, $\theta$ is the mechanical angle that the rotor is rotated by, $\theta_0$ is an initial position angle of the rotor, $\omega$ is a mechanical angular velocity, and $\Lambda_{r0}$ and $\Lambda_{rj}$ are respectively $0^{th}$-order and $jN_r^{th}$-order magnetic permeabilities.

Since the above formula enables qualitative analysis only and disables quantitative solving, in order to quantitatively analyze the magnetic permeance of the rotor, the magnetic permeance of the rotor may be represented as follows according to size parameters of the motor:

$$\Lambda_r(\theta, t) = \frac{u_0}{\delta + \delta_r(\theta, t)}$$

$$\delta_r(\theta, t) = \frac{N_r \beta_r^2 R_{ap}}{64} + \sum_{m=1,2,\cdots}^{\infty} \frac{R_{ap}}{m^2 N_r} \sin^2\left(\frac{m N_r \beta_r}{4}\right) \cos(m N_r(\theta - \omega t - \theta_0))$$

where $\mu_0$ is a relative air magnetic permeance, m is a positive integer, $\beta_r$ is a slot opening width of the rotor, and $R_{ap}$ is an air-gap radius.

Step 3: The distribution of the salient pole teeth affects a form of the stator teeth, and then a magnetic permeance of the stator changes accordingly, and if a variable $S_p$ is used to represent a number of smallest units in different situations, the magnetic permeance of the stator may be represented as:

$$\Lambda_s(\theta) = \Lambda_{s0} + \sum_{k=1,2,\cdots}^{\infty} \Lambda_{sk} \cos(k S_p N_s \theta)$$

where k is a positive integer, and $\Lambda_{s0}$ and $\Lambda_{sk}$ are respectively $0^{th}$-order and $kS_p^{th}$-order magnetic permeabilities.

Like the magnetic permeance of the rotor, the above formula also enables qualitative analysis only and disables quantitative solving. In order to quantitatively analyze the magnetic permeance of the stator, the magnetic permeance of the stator may be represented as follows according to the size parameters of the motor:

$$\Lambda_s(\theta) = \frac{u_0}{\delta + \delta_s(\theta)}$$

$$\delta_s(\theta) = \frac{3 R_{ap}}{16}(2\beta_4^2 + \beta_3^2 + \beta_5^2) + \sum_{n=1,2,\cdots}^{\infty} b_n \cos(n S_p N_s \theta)$$

where n is a positive integer, $$b_n = \frac{R_{ap}}{2n^2 S_p N_s}\left[\begin{array}{l}\sin^2\left(\frac{n S_p N_s \beta_5}{4}\right) + (-1)^n \sin^2\left(\frac{n S_p N_s \beta_3}{4}\right) + \\ 2\sin^2\left(\frac{n S_p N_s \beta_4}{4}\right) \cos\left(n S_p N_s \left(\frac{\beta_5 + \beta_4 + 2\beta_2}{2}\right)\right)\end{array}\right]$$

According to the quantitative representation of the magnetic permeance of the stator, an order and an amplitude of magnetic permeance harmonics of the stator are both related to a value of $S_p$.

Step 4: A magnetic permeance of the motor is a synthetic magnetic permeance of the magnetic permeance of the stator and the magnetic permeance of the rotor:

$$\Lambda(\theta, t) = \frac{\delta}{u_0} \Lambda_s(\theta) \Lambda_r(\theta, t)$$

A flux density of the field windings is represented as:

$$B(\theta, t) = \underbrace{\Lambda_0 \sum_{i=1,3,\cdots}^{\infty} F_i \sin\left(i \frac{N_s}{2} \theta\right)}_{1} + \underbrace{\Lambda_k \sum_{i=1,3,\cdots}^{\infty} \frac{F_i}{2} \sin\left[\left(i \frac{N_s}{2} \pm k S_p N_s\right)\theta\right]}_{2} +$$

-continued $$\Lambda_j \sum_{i=1,3,\cdots}^{\infty} \underbrace{\frac{F_i}{2}\sin\left[\left(i\frac{N_s}{2} \pm jN_r\right)\theta \mp jN_r(\omega t + \theta_0)\right]}_{3} +$$

$$\Lambda_{kj} \sum_{i=1,3,\cdots}^{\infty} \underbrace{\frac{F_i}{2}\sin\left[\left(i\frac{N_s}{2} \pm (kS_pN_s + jN_r)\right)\theta \mp jN_r(\omega t + \theta_0)\right]}_{4} +$$

$$\Lambda_{kj} \sum_{i=1,3,\cdots}^{\infty} \underbrace{\frac{F_i}{2}\sin\left[\left(i\frac{N_s}{2} \pm (kS_pN_s - jN_r)\right)\theta \pm jN_r(\omega t + \theta_0)\right]}_{5}$$

where $\Lambda_0$, $\Lambda_k$, $\Lambda_j$, and $\Lambda_{kj}$ are respectively $0^{th}$-order, $k^{th}$-order, $j^{th}$-order, and $kj^{th}$-order magnetic permeabilities.

The flux density is formed of five parts, the first two parts are stationary, the remaining parts are rotary, and orders of the fourth and fifth parts are both related to $kS_p$. Thus, different $S_p$ makes both harmonic composition of the flux density of the motor and a corresponding amplitude change Step 5: A winding function is.

$$N(\theta) = \frac{2N_i}{\pi} \sum_{v=1,2,\cdots}^{\infty} \frac{(-1)^v}{v} \sin\left(\frac{v\pi}{3}\right)\sin\left(\frac{vN_s}{2}\theta\right)$$

where v is a positive integer, and $N_i$ is a number of turns in series of the armature windings.

A flux linkage of each phase is:

$$\psi_p(t) = R_{ap}l_a \int_0^{2\pi} N(\theta)B(\theta,t)d\theta$$

where $l_a$ is an effective axial length of the motor.

A back electromotive force is:

$$E_p(\theta) = -R_{ap}l_a \frac{d\left(\int_0^{2\pi} N(\theta)B(\theta,t)d\theta\right)}{dt}$$

A magnetic permeance of the stator, flux densities, flux linkages, and back electromotive forces in the three models can be calculated through derivation according to the above formulas. First, influences of different distributions of the salient pole teeth on magnetic permeance harmonics of the stator are analyzed according to a magnetic permeance model; then, differences in orders and amplitudes of the flux densities in different situations are obtained through the calculated flux densities; afterwards, magnitudes of flux linkages in different distributions are compared; and finally, an optimal distribution structure is obtained through the calculated back electromotive forces.

Example

FIG. 1 is a schematic structural view of a doubly salient linear motor in an embodiment of the present invention. As shown in FIG. 1, the motor is a three-phase motor and includes a stator (1) and a rotor (2). The stator includes a stator core, armature windings (6), field windings (5), first permanent magnets (81), and second permanent magnets (82). Each of stator teeth (3) is split into two field winding teeth (4), and each of the field winding teeth (4) is split into two salient pole teeth (71 and 72). The armature windings (6) are wound around the stator teeth (3), and each of the field windings (5) is wound around adjacent two of the field winding teeth (4) that are split from different stator teeth (3).

The first permanent magnets and the second permanent magnets are both placed in field winding slots, the first permanent magnets are placed on openings of the field winding slots, and the second permanent magnets are placed on bottoms of the field winding slots. The two kinds of permanent magnets are both tangentially magnetized, and first permanent magnets and second permanent magnets in the same slot have opposite magnetization polarities, and form a path in a single stator tooth. Permanent magnets placed at same positions of adjacent field winding slots have opposite polarities, and permanent magnets in different slots are independent of each other. In the embodiment, the number $N_s$ of stator teeth of the motor is 6, the number of first salient pole teeth is 12, the number of second salient pole teeth is 12, and a total of 24 salient pole teeth exist.

FIG. 2 illustrates a connection relationship of the armature winding, where the armature winding is fed with a three-phase alternating current, and an electrical angle of 120° exists between phases.

FIG. 3 illustrates a connection relationship of the field winding, where the field winding is fed with a direct current, and the polarity of the current affects the direction of the thrust.

Figure 4:
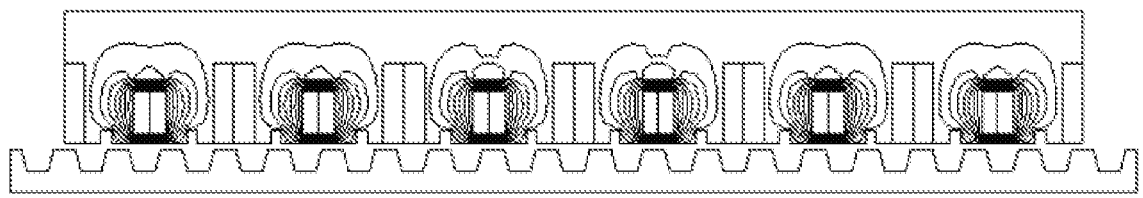
FIG. 4 is a schematic diagram of magnetic field distribution when only permanent magnets function alone in the example of the present invention.

FIG. 4 illustrates the magnetic field distribution when the permanent magnets perform excitation alone. It can be seen from the figure that two permanent magnets in each field winding slot form a closed magnetic path in a stator tooth.

Figure 5A:
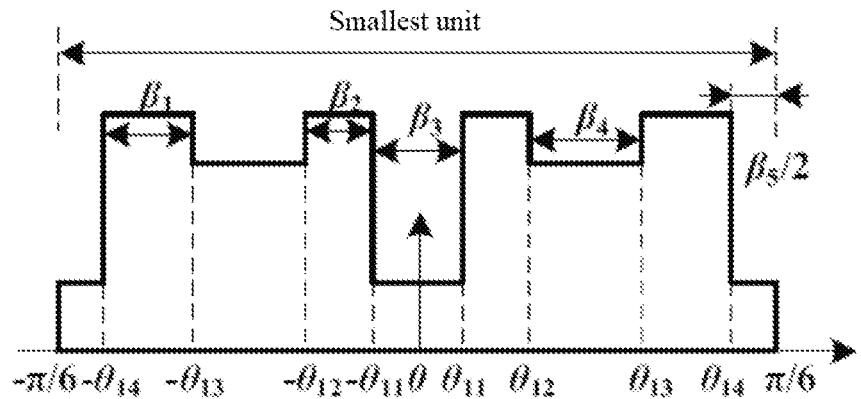
FIGS. 5A-5C illustrate the distribution of salient pole teeth according to a relationship between $\beta_1$, $\beta_2$, $\beta_3$, $\beta_4$, and $\beta_5$ in the embodiment of the present invention, where
Figure 5B:
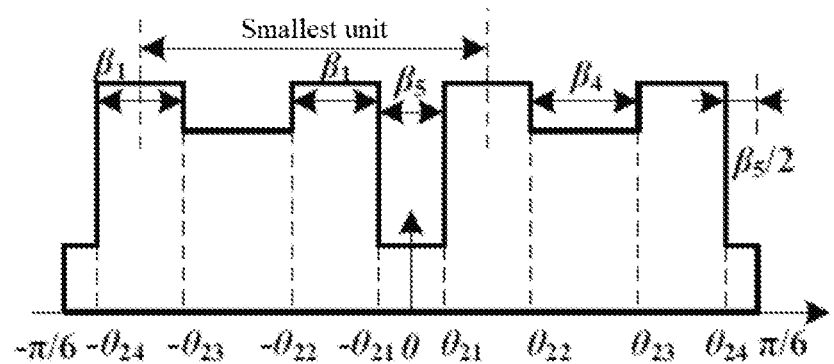
Figure 5C:
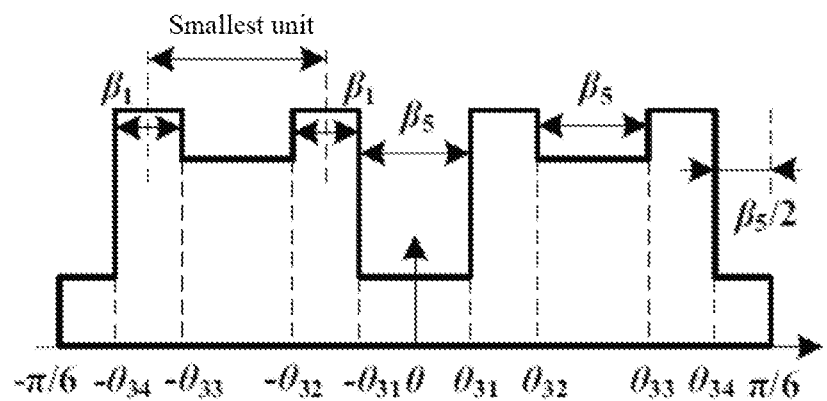

FIGS. 5A-5C illustrate the distribution of salient pole teeth according to a relationship between $\beta_1$, $\beta_2$, $\beta_3$, $\beta_4$, and $\beta_5$. FIG. 5A illustrates that when the five variables are unequal to each other ($\beta_1 \neq \beta_2 \neq \beta_3 \neq \beta_4 \neq \beta_5$), each stator tooth has one smallest unit; FIG. 5B illustrates that when widths of slot openings of the field windings and slot openings of the armature windings are equal and widths of the first salient pole teeth and the second salient pole teeth are equal, that is, ($\beta_1 \neq \beta_4 \neq \beta_3$, $\beta_1 = \beta_2$, $\beta_3 = \beta_5$), each stator tooth has two smallest units; FIG. 5C illustrates that when the widths of the slot openings of the field windings, the slot openings of the armature windings, and field winding recesses are equal and the widths of the first salient pole teeth and the second salient pole teeth are equal, that is, ($\beta_1 \neq \beta_3$, $\beta_1 = \beta_2 = \beta_4$, $\beta_3 = \beta_5$), each stator tooth has four smallest units.

Figure 6A:
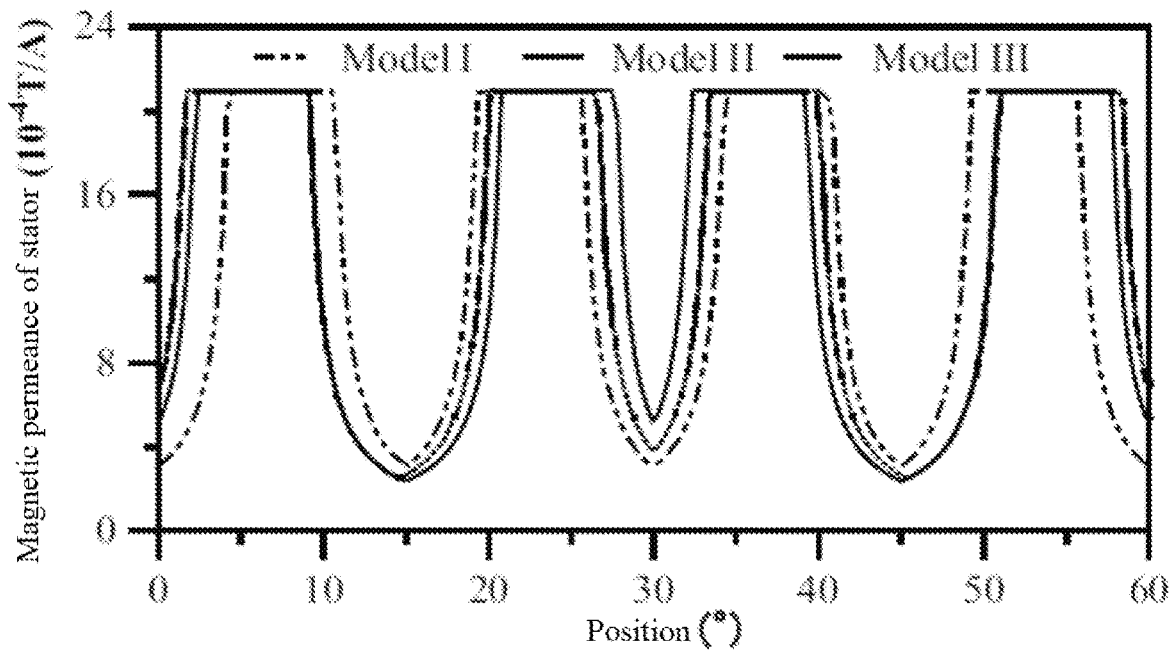
FIGS. 6A-6B illustrate waveforms and harmonic distributions of magnetic permeance of a stator in different distributions of salient pole teeth when only field windings function alone in the embodiment of the present invention, where
Figure 6B:
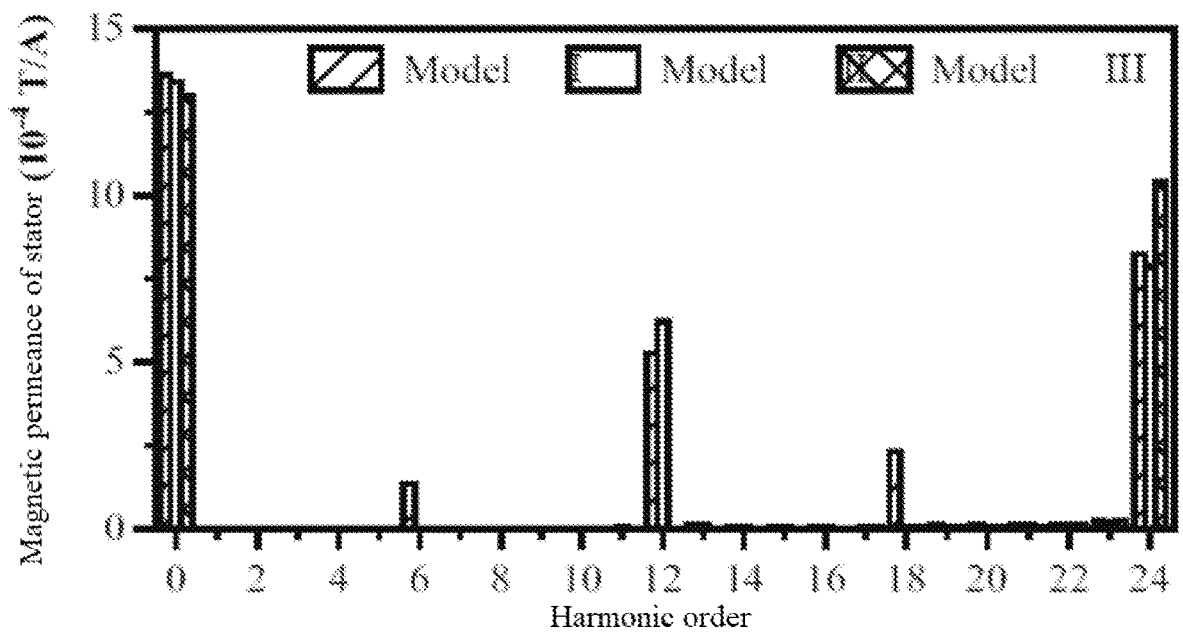

FIGS. 6A-6B illustrate waveforms and harmonic distributions of a magnetic permeance of the stator in three distributions of salient pole teeth, where model I represents the distribution of salient pole teeth where the five variables are unequal to each other, and each stator tooth has only one smallest unit, and the number $S_p$ of smallest units is 1; model II represents the distribution of salient pole teeth where widths of slot openings of the field windings and slot openings of the armature windings are equal and widths of the first salient pole teeth and the second salient pole teeth are equal, and each stator tooth has two smallest units, and the number $S_p$ of smallest units is 2; model III represents that the widths of the slot openings of the field windings and the slot openings of the armature windings, and field winding recesses are equal and the widths of the first salient pole teeth and the second salient pole teeth are equal, each stator tooth has four smallest units, and the number $S_p$ of smallest units is 4. It can be seen from the figure that within $24^{th}$-order harmonics, harmonics of model I are of $6^{th}$ order, $12^{th}$ order, $18^{th}$ order, and $24^{th}$ order; harmonics of model II are of $12^{th}$ order and $24^{th}$ order; harmonics of model III are of $24^{th}$ order. Then, the harmonic orders of the three models may be separately represented as $S_pN_s$.

Figure 7A:
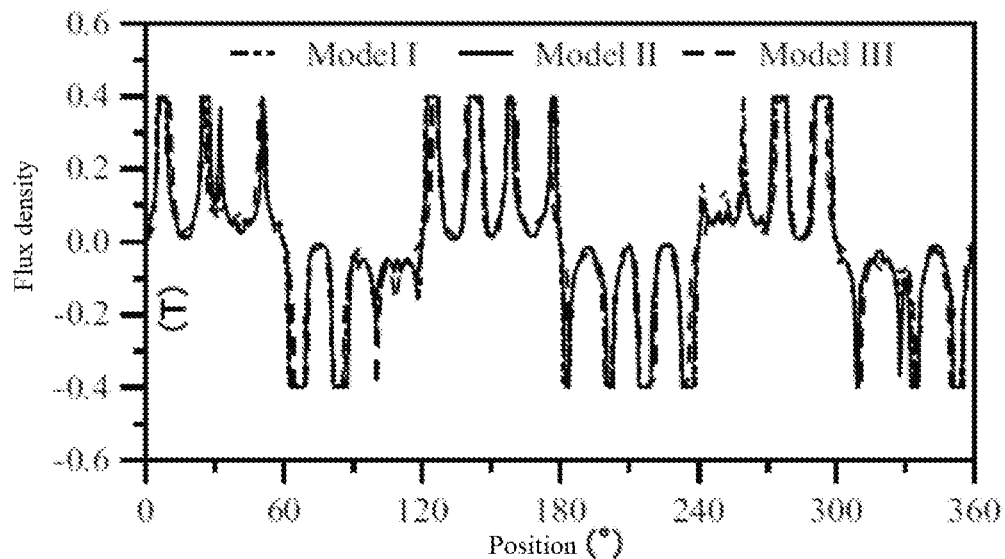
FIGS. 7A-7B illustrate waveforms and harmonic distributions of an air-gap flux density in different distributions of salient pole teeth when only the field windings function alone in the embodiment of the present invention, where
Figure 7B:
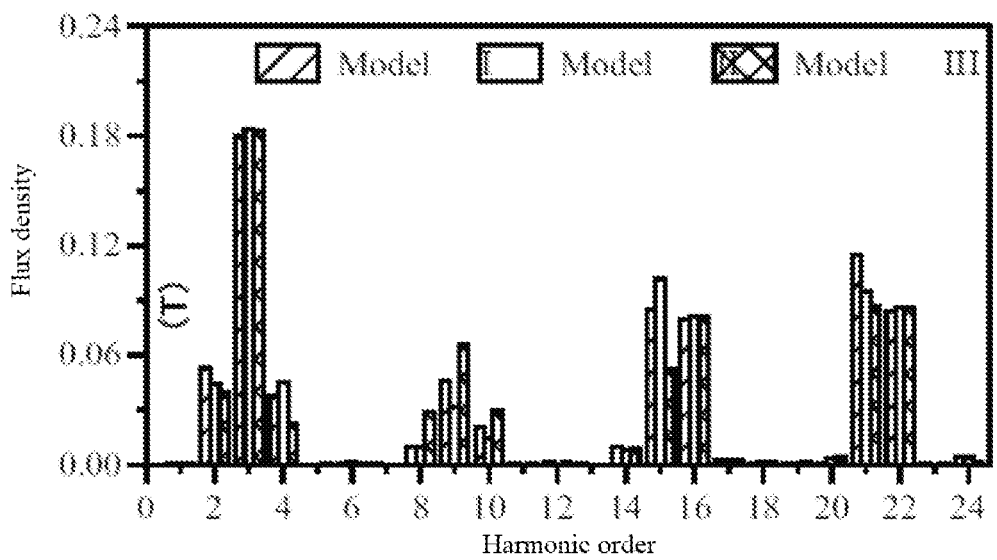

FIGS. 7A-7B illustrate waveforms and harmonic distributions of an air-gap flux density in three distributions of salient pole teeth. It can be seen from the figure that the three models have the same harmonic order but different amplitudes, where harmonics of 2nd order, 4th order, 8th order, 10th order, 14th order, 16th order, and 22th order are all working harmonics. To facilitate analysis, working harmonics of higher harmonic orders and less contribution are ignored. model I has the highest amplitude of $2^{nd}$-order harmonics; model II has the highest amplitude of $4^{th}$-order harmonics; model III has the highest amplitude of $8^{th}$-order harmonics. According to the result, the distribution of salient pole teeth has great influence on the amplitude of harmonics.

Figure 8A:
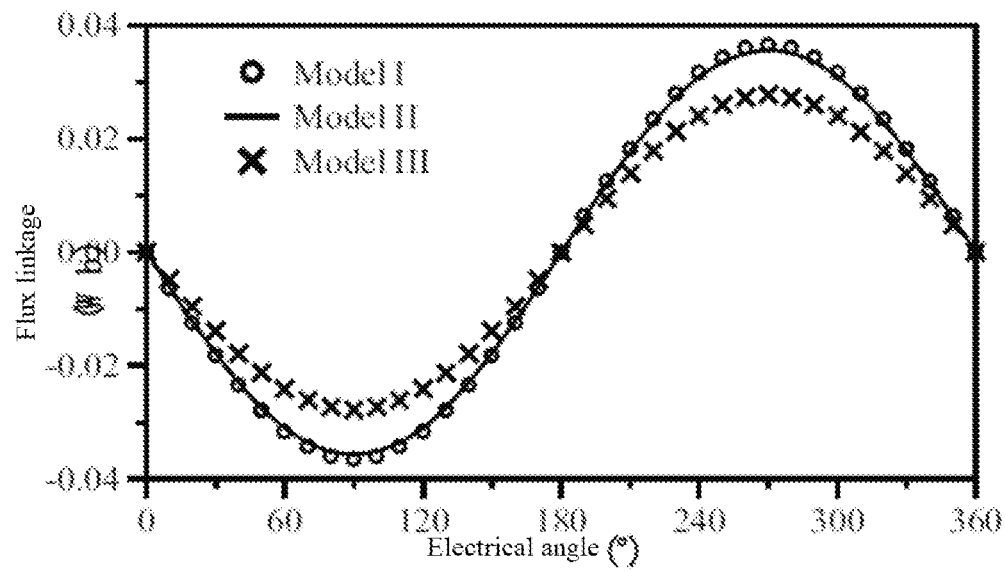
FIGS. 8A-8B illustrate waveforms and harmonic distributions of a flux linkage in different distributions of salient pole teeth when only the field windings function alone in the embodiment of the present invention, where
Figure 8B:
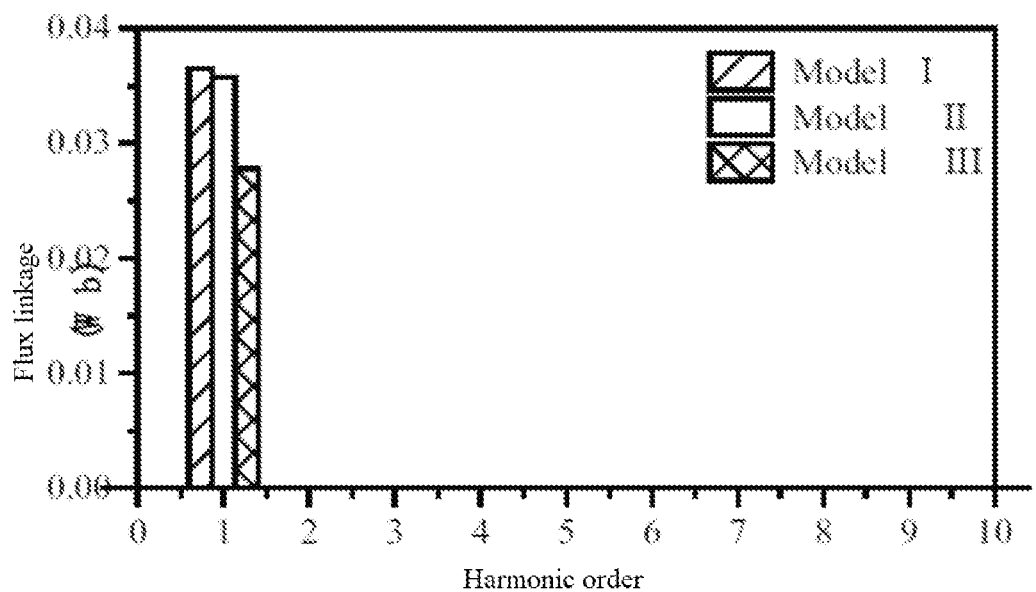

FIGS. 8A-8B illustrate waveforms and harmonic distributions of a flux linkage in three distributions of salient pole teeth. It can be seen from the figure that the fundamental amplitude of model I is the highest, which is 0.037 Wb; the fundamental amplitude of model II is the second highest, which is 0.036 Wb; the fundamental amplitude of model III is the lowest, which is 0.028 Wb. model I and model II have small difference, while model III is 26% lower than model I.

Figure 9A:
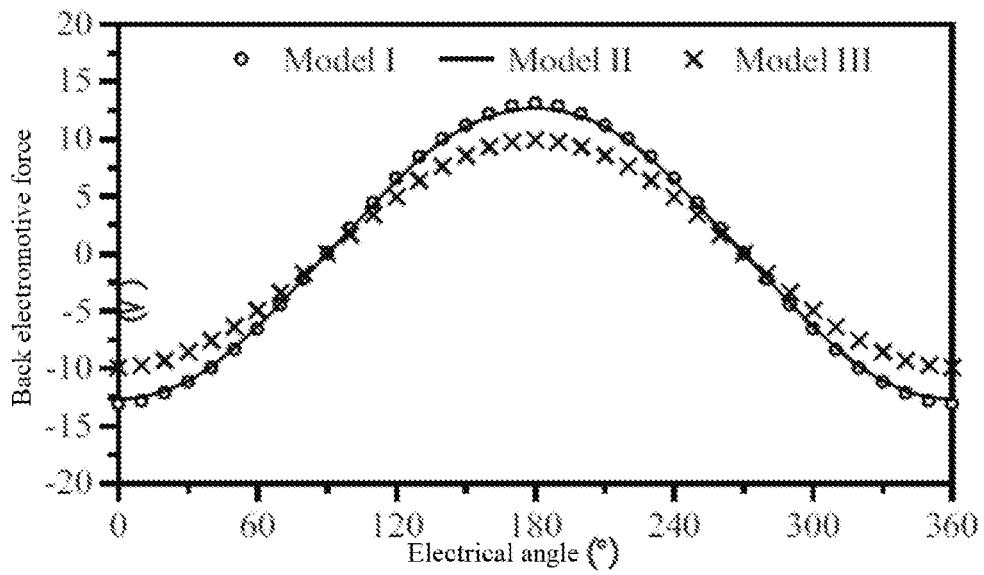
FIGS. 9A-9B illustrate waveforms and harmonic distributions of a back electromotive force in different distributions of salient pole teeth when only the field windings function alone in the embodiment of the present invention, where
Figure 9B:
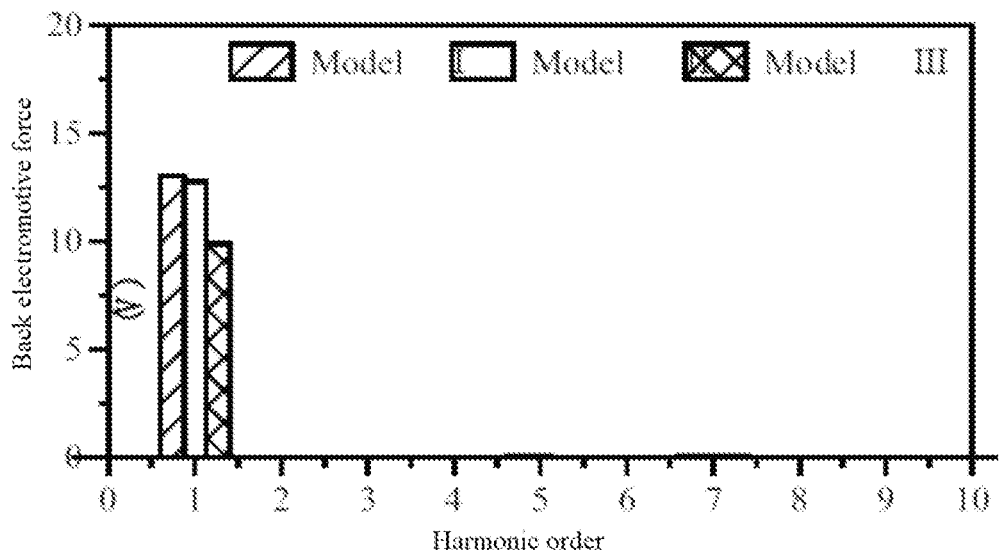

FIGS. 9A-9B illustrate waveforms and harmonic distributions of a back electromotive force in three distributions of salient pole teeth. It can be seen from the figure that the case of the back electromotive force is the same as that of the flux linkage. The fundamental amplitude of model I is the highest, which is 13.0 V; the fundamental amplitude of model II is the second highest, which is 12.7 V; the fundamental amplitude of model III is the lowest, which is 9.9 V. It can be found upon comparison that the distribution mode of salient pole teeth in model I has the best effects.

Figure 10:
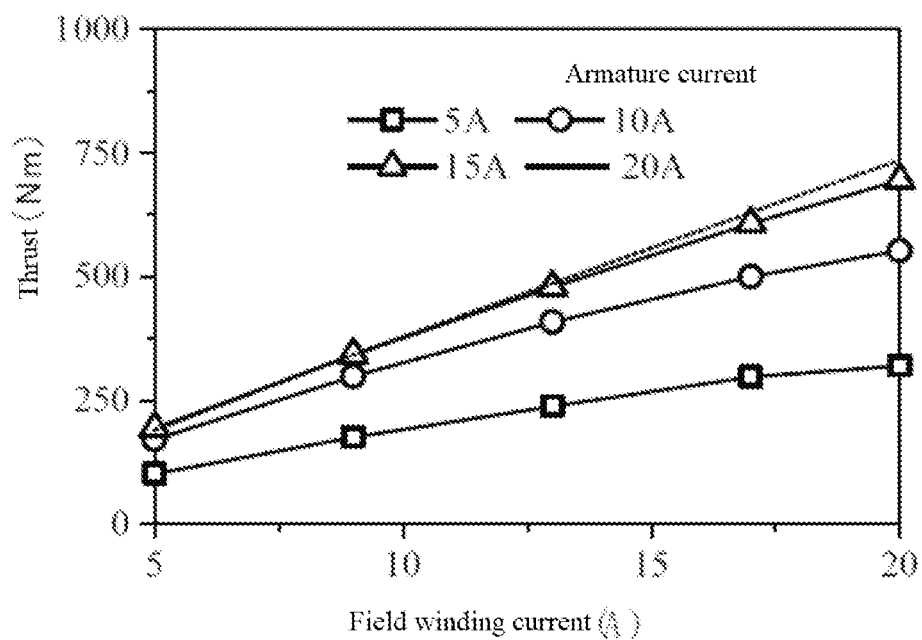
FIG. 10 illustrates curves of variations of a thrust of the motor with currents when no permanent magnets exist and the field windings and the armature windings function in the embodiment of the present invention.

FIG. 10 illustrates curves of variations of a thrust of the motor with currents when no permanent magnets exist and the field windings and the armature windings function. When the current in the armature windings is 5 A, and the current in the field windings increases from 5 A to 20 A, the thrust increases from 102 N to 320 N; when the current in the armature windings is 10 A, and the current in the field windings increases from 5 A to 20 A, the thrust increases from 172 N to 553 N; when the current in the armature windings is 15 A, and the current in the field windings increases from 5 A to 20 A, the thrust increases from 194 N to 694 N: when the current in the armature windings is 20 A, and the current in the field windings increases from 5 A to 20 A, the thrust increases from 191 N to 736 N. According to the result, when the current in the armature windings is 20 A and the current in the field windings is 5 A, the motor is already saturated.

Figure 11:
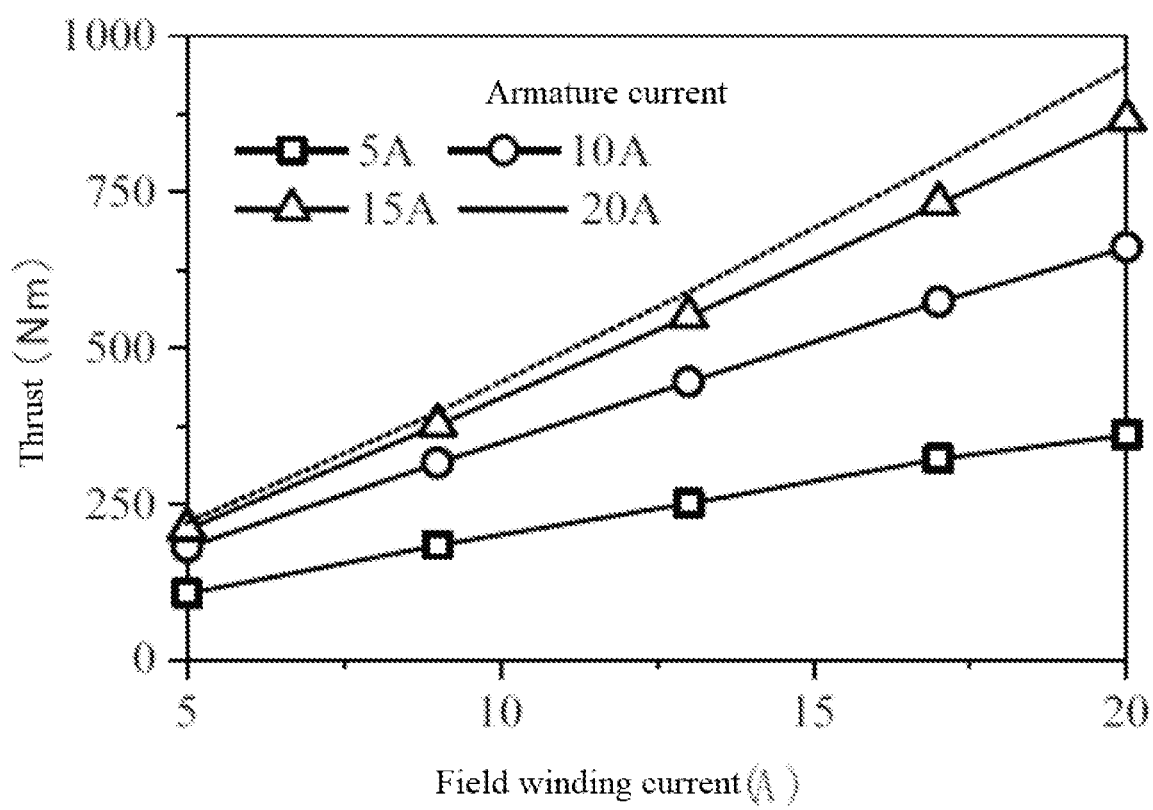
FIG. 11 illustrates curves of variations of the thrust of the motor with currents when permanent magnets are placed in the field windings and both the field windings and the armature windings function in the embodiment of the present invention.

FIG. 11 illustrates curves of variations of the thrust of the motor with currents when permanent magnets are placed in the field windings and both the field windings and the armature windings function. When the current in the armature windings is 5 A, and the current in the field windings increases from 5 A to 20 A, the thrust increases from 106 N to 360 N; when the current in the armature windings is 10 A, and the current in the field windings increases from 5 A to 20 A, the thrust increases from 180 N to 661 N; when the current in the armature windings is 15 A, and the current in the field windings increases from 5 A to 20 A, the thrust increases from 210 N to 866 N; when the current in the armature windings is 20 A, and the current in the field windings increases from 5 A to 20 A, the thrust increases from 220 N to 952 N. Upon comparison between FIGS. 10 and 11, it can be seen that the design of the permanent magnets inhibits saturation of the motor, so that the motor has higher thrust ability.

In view of the above, the present invention discloses a field modulated doubly salient motor and a design method for a distribution of salient pole teeth thereof. The motor includes a stator and a mover, where the stator includes a stator core, two sets of windings, and two sets of permanent magnets. Each of the stator teeth is split into two field winding teeth, and each of the field winding teeth is split into two salient pole teeth. The two sets of windings are respectively armature windings and field windings, where the armature windings are wound around stator teeth, and the field windings are wound around adjacent field winding teeth that are split from different stator teeth. The two sets of tangentially magnetized permanent magnets are respectively placed on openings and bottoms of field winding slots, and permanent magnets placed in the same slot or at the same positions of adjacent slots have opposite polarities. The doubly salient structure design of the present invention enables a magnetic field to modulate abundant working harmonics in an air gap to Improve the thrust of the motor; a magnetic path of the permanent magnets forms a path only in stator teeth, so that the problem that the motor is easily saturated is solved. In the design method for the distribution of the salient pole teeth according to the present invention, distribution modes of salient pole teeth are generalized according to a size relationship, magnetic permeance of a stator and a rotor, flux densities, flux linkages, back electromotive forces, and so on are solved through formula derivation according to the theory of magnetic field modulation, and harmonic contribution amplitudes are adjusted by changing the distribution of salient pole teeth, thereby improving the thrust of the motor. The motor in the present invention patent applies to a linear structure, and the design idea also applies to a rotational structure. With the structural feature that all excitations are placed on a stator, the motor has great application prospect in rail transit requiring long stroke and large thrust.

In the description of this specification, the description with reference to the term "an embodiment," "some embodiments," "exemplary embodiments," "examples," "specific examples," "some examples" or the like means that specific features, structures, materials, or characteristics described in conjunction with the embodiment or example are included in at least one embodiment or example of the present invention. In this specification, the schematic expressions of the above terms do not necessarily refer to the same embodiment or example. Furthermore, the specific features, structures, materials, or characteristics described may be combined in any suitable manner in any one or more embodiments or examples.

Although the embodiments of the present invention have been shown and described, those of ordinary skill in the art can understand that various changes, modifications, replacements, and variations can be made to these embodiments without departing from the principles and purpose of the present invention, and the scope of the present invention is defined by the claims and their equivalents.

What is claimed is:

1. A field modulated doubly salient motor, comprising a stator and a mover, wherein the stator comprises a stator core, stator teeth, armature windings, field windings, first permanent magnets, and second permanent magnets; each of the stator teeth is split into two field winding teeth, each of the field winding teeth is split into a first salient pole tooth and a second salient pole tooth;

the armature windings are wound around the stator teeth, and in order to ensure that centerlines of the field windings and the armature windings have a distance of half a stator tooth, each of the field windings is wound around adjacent two of the field winding teeth that are split from different stator teeth;

the first permanent magnets and the second permanent magnets are both tangentially magnetized and are both placed in field winding slots, the first permanent magnets are placed on openings of the field winding slots, and the second permanent magnets are embedded on bottoms of the field winding slots; permanent magnets placed at same positions of adjacent two of the slots have opposite polarities, and permanent magnets in a same slot also have opposite polarities; when permanent magnet excitation is performed alone, two permanent magnets in the same slot form a closed magnetic path in a stator tooth; and the mover is formed by arranging a plurality of rotor salient poles.

2. The field modulated doubly salient motor according to claim 1, wherein tooth widths of the first salient pole tooth and the second salient pole tooth split from a same field winding tooth are independent and do not affect each other; a distribution of the salient pole teeth of the stator is optimized, and an amplitude of each order of working harmonics is adjusted to improve a thrust of the motor.

3. The field modulated doubly salient motor according to claim 1, wherein a tooth number of the stator teeth is $N_s$, the widths of the first salient pole tooth and the second salient pole tooth are respectively $\beta_1$ and $\beta_2$, slot opening widths of the armature windings and the field windings are respectively $\beta_3$ and $\beta_5$, a width of a field winding recess formed after a single field winding tooth is split is $\beta_4$, a number of the rotor salient poles is $N_r$, each tooth pole pitch is $\tau_p$, and a relationship between the parameters is represented as:

$\beta_1+\beta_2+\beta_3+\beta_4+\beta_5=N_r\tau_p/N_s$.

4. A design method for a distribution of salient pole teeth of the field modulated doubly salient motor according to claim 3, wherein a total number of salient pole teeth of the stator is $4N_s$, wherein a number of first salient pole teeth and a number of second salient pole teeth are both $2N_s$, the distribution of the salient pole teeth is related to $\beta_1$, $\beta_2$, $\beta_3$, $\beta_4$, and $\beta_5$, and the design method for the distribution of the salient pole teeth comprises: generalizing distribution rules of the salient pole teeth; deriving an order and an amplitude of a no-load air-gap flux density in each situation; and then solving a back electromotive force through the flux density, and comparing magnitudes of back electromotive forces to obtain an optimal mode of distribution of the salient pole teeth:

the design method specifically comprises:

step 1: starting from $\beta_1$, $\beta_2$, $\beta_3$, $\beta_4$, and $\beta_5$, designing the distribution of the salient pole teeth, wherein based on a single stator tooth, the distribution of the salient pole teeth is generalized into the following three models Model:

Model I: when $\beta_1$, $\beta_2$, $\beta_3$, $\beta_4$ and $\beta_5$ are unequal to each other, each stator tooth has one smallest unit;

Model II: when widths of slot openings of field windings and slot openings of armature windings are equal and widths of the first salient pole teeth and the second salient pole teeth are equal, that is, $\beta_1 \neq \beta_4 \neq \beta_3$, $\beta_1=\beta_2$, $\beta_3=\beta_5$, each stator tooth has two smallest units;

Model III: when the widths of the slot openings of the field windings, the slot openings of the armature windings, and field winding recesses are equal and the widths of the first salient pole teeth and the second salient pole teeth are equal, that is, $\beta_1 \neq \beta_3$, $\beta_1=\beta_2=\beta_4$, $\beta_3=\beta_5$, each stator tooth has four smallest units;

step 2: the first permanent magnets and the second permanent magnets form closed magnetic paths only in a stator core, and an air-gap flux density is generated by the field windings, so that only the field windings need to be analyzed, wherein an air-gap magnetomotive force of the field windings is:

$$F_{fw}(\theta) = \sum_{i=1,3,\cdots}^{\infty} \frac{16N_f i_f \sin(iN_s\beta_5/2)}{\pi N_s \beta_5 i^2} \sin\left(\frac{N_s}{2}i\theta\right)$$

wherein $F_{fw}$ is a magnetomotive force of the field windings, i is a positive odd number, $\theta$ is a mechanical angle that a rotor is rotated by, and $N_f$ and $i_f$ are respectively a number of turns in series per phase and a field winding current;

a magnetic permeance of the rotor is:

$$\Lambda_r(\theta, t) = \Lambda_{r0} + \sum_{j=1,2,\cdots}^{\infty} \Lambda_{rj}\cos[jN_r(\theta - \omega t - \theta_0)]$$

wherein j is a positive integer, $\theta$ is the mechanical angle that the rotor is rotated by, $\theta_0$ is an initial position angle of the rotor, $\omega$ is a mechanical angular velocity, and $\Lambda_{r0}$ and $\Lambda_{rj}$ are respectively $0^{th}$-order and $jN_r^{th}$-order magnetic permeabilities;

since the above formula enables qualitative analysis only and disables quantitative solving, in order to quantitatively analyze the magnetic permeance of the rotor, the magnetic permeance $\Lambda_r(\theta,t)$ of the rotor is represented as follows according to size parameters of the motor:

$$\Lambda_r(\theta, t) = \frac{u_0}{\delta + \delta_r(\theta, t)}$$

wherein $\mu_0$ is a relative air magnetic permeance, $\delta$ is an air-gap length, and $\delta_r(\theta,t)$ is an air-gap length on the rotor side;

$$\delta_r(\theta, t) = \frac{N_r \beta_r^2 R_{ap}}{64} + \sum_{m=1,2,\cdots}^{\infty} \frac{R_{ap}}{m^2 N_r} \sin^2\left(\frac{mN_r\beta_r}{4}\right)\cos(mN_r(\theta - \omega t - \theta_0))$$

wherein m is a positive integer, $\beta_r$ is a slot opening width of the rotor, $R_{ap}$ is an air-gap radius, and t is a corresponding time;

step 3: the distribution of the salient pole teeth affects a form of the stator teeth, and then a magnetic permeance of the stator changes accordingly, and when a variable $S_p$ is used to represent a number of smallest units in different situations, the magnetic permeance $\Lambda_s(\theta)$ of the stator is represented as:

$$\Lambda_s(\theta) = \Lambda_{s0} = \sum_{k=1,2,\cdots}^{\infty} \Lambda_{sk}\cos(kS_pN_s\theta)$$

wherein k is a positive integer, $\Lambda_{s0}$ and $\Lambda_{sk}$ are respectively $0^{th}$-order and $kS_p^{th}$ order magnetic permeabilities;

like the magnetic permeance of the rotor, the above formula also enables qualitative analysis only and disables quantitative solving, and in order to quantitatively analyze the magnetic permeance of the stator, the magnetic permeance of the stator is represented as follows according to the size parameters of the motor:

$$\Lambda_s(\theta) = \frac{u_0}{\delta + \delta_s(\theta)}$$

$$\delta_s(\theta) = \frac{3R_{ap}}{16}(2\beta_4^2 + \beta_3^2 + \beta_5^2) + \sum_{n=1,2,\cdots}^{\infty} b_n\cos(nS_pN_s\theta)$$

wherein n is a positive integer, $\delta_s(\theta)$ is an air-gap length on the stator side, and the coefficient $b_n$ is represented as:

$$b_n = \frac{R_{ap}}{2n^2 S_p N_s}\left[\begin{array}{c}\sin^2\left(\frac{nS_pN_s\beta_5}{4}\right) + (-1)^n\sin^2\left(\frac{nS_pN_s\beta_3}{4}\right) + \\ 2\sin^2\left(\frac{nS_pN_s\beta_4}{4}\right)\cos\left(nS_pN_s\left(\frac{\beta_5 + \beta_4 + 2\beta_2}{2}\right)\right)\end{array}\right]$$

according to the quantitative representation of the magnetic permeance of the stator, an order and an amplitude of magnetic permeance harmonics of the stator are both related to a value of $S_p$;

step 4: a magnetic permeance of the motor is a synthetic magnetic permeance $\Lambda(\theta,t)$ of the magnetic permeance of the stator and the magnetic permeance of the rotor:

$$\Lambda(\theta, t) = \frac{\delta}{u_0}\Lambda_s(\theta)\Lambda_t(\theta, t)$$

a flux density $B(\theta,t)$ of the field windings is represented as:

$$B(\theta, t) = \Lambda_0 \underbrace{\sum_{i=1,3,\cdots}^{\infty} F_i\sin\left(i\frac{N_s}{2}\theta\right)}_{1} + \Lambda_k \underbrace{\sum_{i=1,3,\cdots}^{\infty} \frac{F_i}{2}\sin\left[\left(i\frac{N_s}{2} \pm kS_pN_s\right)\theta\right]}_{2} +$$

$$\Lambda_j \underbrace{\sum_{i=1,3,\cdots}^{\infty} \frac{F_i}{2}\sin\left[\left(i\frac{N_s}{2} \pm jN_r\right)\theta \mp jN_r(\omega t + \theta_0)\right]}_{3} +$$

$$\Lambda_{kj} \underbrace{\sum_{i=1,3,\cdots}^{\infty} \frac{F_i}{2}\sin\left[\left(i\frac{N_s}{2} \pm (kS_pN_s + jN_r)\right)\theta \mp jN_r(\omega t + \theta_0)\right]}_{4} +$$

-continued $$\Lambda_{kj} \underbrace{\sum_{i=1,3,\cdots}^{\infty} \frac{F_i}{2}\sin\left[\left(i\frac{N_s}{2} \pm (kS_pN_s - jN_r)\right)\theta \pm jN_r(\omega t + \theta_0)\right]}_{5}$$

wherein $\Lambda_0$, $\Lambda_k$, $\Lambda_j$, and $\Lambda_{kj}$ are respectively $0^{th}$-order, stator $k^{th}$-order, $j^{th}$-order, and $kj^{th}$-order magnetic permeabilities, and $F_i$ is a coefficient;

the flux density is formed of five parts, the first two parts are stationary, the remaining parts are rotary, and orders of the fourth and fifth parts are both related to $kS_p$; thus, different $S_p$ makes both harmonic composition of the flux density of the motor and a corresponding amplitude change;

step 5: a winding function $N(\theta)$ is:

$$N(\theta) = \frac{2N_i}{\pi} \sum_{v=1,2,\cdots}^{\infty} \frac{(-1)^v}{v}\sin\left(\frac{v\pi}{3}\right)\sin\left(\frac{vN_s}{2}\theta\right)$$

wherein v is a positive integer, and $N_i$ is a number of turns in series of the armature windings;

a flux linkage $\Psi_p(t)$ of each phase is:

$$\Psi_p(t) = R_{ap}l_a\int_0^{2\pi} N(\theta)B(\theta,t)d\theta$$

wherein $l_a$ is an effective axial length of the motor;

a back electromotive force is:

$$E_p(\theta) = -R_{ap}l_a\frac{d\left(\int_0^{2\pi} N(\theta)B(\theta, t)d\theta\right)}{dt}$$

magnetic permeance of the stator, flux densities, flux linkages, and back electromotive forces in the three models are calculated through derivation according to the above formulas, first, influences of different distributions of the salient pole teeth on magnetic permeance harmonics of the stator are analyzed according to a magnetic permeance model; then, differences in orders and amplitudes of the flux densities in different situations are obtained through the calculated flux densities; afterwards, magnitudes of flux linkages in different distributions are compared; and finally, an optimal distribution structure is obtained through the calculated back electromotive forces.

* * * * *